UNITED STATES PATENT OFFICE.

ALEXANDER KLEIN, OF BERLIN, GERMANY.

PROCESS OF PRODUCING DERIVATIVES OF CANTHARIDIC ACID CONTAINING IODIN AND MERCURY.

1,017,560.

No Drawing.

Specification of Letters Patent. Patented Feb. 13, 1912.

Application filed June 29, 1911. Serial No. 636,013.

*To all whom it may concern:*

Be it known that I, ALEXANDER KLEIN, a subject of the Emperor of Germany, residing at Berlin, Germany, have invented a new and useful Improvement in Processes for Producing Derivatives of Cantharidic Acid Containing Iodin and Mercury, of which the following is a specification.

My invention relates to an improvement in the process of producing derivatives of cantharidic acid containing iodin and mercury, set forth in my German Patent, No. 193,219, in which process a precipitate of iodin cantharidinate in the form of a powder, is formed upon the addition of sodium sulfite to an alcoholic solution of cantharidic acid, mercuric chlorid, and iodin.

The present invention has for its object the production of such derivatives in forms of various solubilities. This result in the present invention is attained by the use of alkali; and the greater the amount of the alkali used, the more insoluble is the product formed. The best procedure is to mix the cantharidin with the alkali before adding the other constituents. Instead of using iodin, compounds of iodin, as, for example, any salt of the same, may be taken; or compounds of iodin may be brought directly in reaction with the mercury.

The desired result may be obtained in the following ways: *a.* Cantharidic acid or tincture of cantharidin treated with a large amount of alkali is added to a mixture of one molecule of mercuric chlorid and half a molecule of iodin, allowed to rest, or shaken, or boiled; whereupon, upon disappearance of the iodin, a large amount of sediment separates, being mostly non-soluble, thus forming a derivative of low solubility. *b.* To cantharidic acid or tincture of cantharidin treated with alkali, a mixture of mercuric chlorid and iodid of sodium is added and treated as in the first example, whereupon, according to the amount of alkali used, either a combination of the constituents, dissolved in the liquid, which for example may be alcohol, is formed; or a non-soluble combination is obtained by using a greater amount of alkali. Suitable solvents other than alcohol may be used.

The advantage of this new process is the production at will of quite soluble, partly soluble, or non-soluble compounds in a stable state.

For using the product, so obtained, as a caustic, it may be wholly dissolved in a liquid, or applied as a solid powder, or mixed with an ungent or other drugs, substances, etc., as, for example, alcohol, ether, chloroform, aldehydes, phenols, oils, fatty substances, etc.

An important advantage of the product formed by this process lies in the possibility of easily dividing the product into desired doses.

What I claim is—

The process of producing a derivative of cantharidic acid containing iodin and mercury, consisting in treating a solution of cantharidic acid with substances containing iodin and mercury in the presence of an alkali.

In witness whereof I have hereunto signed my name in presence of two subscribing witnesses this 14th day of June 1911.

ALEXANDER KLEIN.

Witnesses:
OTTO FRIESC,
M. HAUNKE.